United States Patent
Densham et al.

(10) Patent No.: US 8,598,844 B2
(45) Date of Patent: *Dec. 3, 2013

(54) SYSTEMS AND METHODS FOR BALANCING BATTERY CELLS

(75) Inventors: William Densham, Los Gatos, CA (US); Constantin Bucur, Sunnyvale, CA (US); Flavius Lupu, San Jose, CA (US); Jiun Heng Goh, Sunnyvale, CA (US); Stefan Maireanu, Sunnyvale, CA (US)

(73) Assignee: O2Micro, Inc., Santa Clara, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/278,555

(22) Filed: Oct. 21, 2011

(65) Prior Publication Data

US 2012/0038323 A1 Feb. 16, 2012

Related U.S. Application Data

(63) Continuation of application No. 12/613,333, filed on Nov. 5, 2009, now Pat. No. 8,148,942.

(51) Int. Cl.
*H02J 7/00* (2006.01)

(52) U.S. Cl.
USPC ........... 320/116; 320/124; 320/136; 363/142; 363/147; 323/251; 323/332

(58) Field of Classification Search
USPC ........................................................ 320/116
See application file for complete search history.

(56) References Cited

U.S. PATENT DOCUMENTS

| | | | |
|---|---|---|---|
| 3,307,096 A | 2/1967 | Lyon | |
| 4,232,260 A | 11/1980 | Lambkin | |
| 5,659,237 A * | 8/1997 | Divan et al. | 320/119 |
| 5,666,041 A * | 9/1997 | Stuart et al. | 320/116 |
| 6,133,707 A * | 10/2000 | Kikuchi et al. | 320/104 |
| 6,314,007 B2 * | 11/2001 | Johnson et al. | 363/37 |
| 6,586,910 B2 | 7/2003 | Matsui et al. | |

(Continued)

FOREIGN PATENT DOCUMENTS

| | | |
|---|---|---|
| CN | 101467326 A | 6/2009 |
| CN | 101567574 A | 10/2009 |

(Continued)

OTHER PUBLICATIONS

European Search Report issued in EP Application No. 10161777.7, dated Dec. 6, 2011, (9 pages),which was previously submitted for parent US Patent Application Publication No. 20110101916.

*Primary Examiner* — Yalkew Fantu

(57) ABSTRACT

In a power converter, a primary winding receives an input power. In addition, multiple secondary windings transform the input power into multiple charging currents to charge a set of cells via a set of paths. The multiple secondary windings further balance the set of cells based on the charging currents. A ratio between a first turn number of a first secondary winding of the secondary windings and a second turn number of a second secondary winding of the secondary windings is determined by a nominal voltage ratio between two corresponding cells of the set of cells.

20 Claims, 7 Drawing Sheets

(56) References Cited

U.S. PATENT DOCUMENTS

| | | | |
|---|---|---|---|
| 6,873,134 B2 * | 3/2005 | Canter et al. | 320/118 |
| 7,312,596 B2 | 12/2007 | Bolz et al. | |
| 7,821,229 B2 | 10/2010 | Wang et al. | |
| 7,965,061 B2 | 6/2011 | Li et al. | |
| 8,148,942 B2 * | 4/2012 | Densham et al. | 320/116 |
| 2004/0178768 A1 * | 9/2004 | Miyazaki et al. | 320/116 |
| 2010/0225275 A1 | 9/2010 | Bucur et al. | |
| 2010/0283433 A1 | 11/2010 | Oh et al. | |
| 2011/0101916 A1 | 5/2011 | Densham et al. | |
| 2012/0062038 A1 | 3/2012 | Wang | |

FOREIGN PATENT DOCUMENTS

| | | |
|---|---|---|
| DE | 102008016957 A1 | 10/2009 |
| JP | 2004072975 A | 3/2004 |
| TW | 200832862 A | 8/2008 |
| TW | 200937803 A | 9/2009 |
| TW | M365010 U | 9/2009 |
| WO | 2005074092 A1 | 8/2005 |
| WO | 2008097033 A1 | 8/2008 |

* cited by examiner

SYSTEMS AND METHODS FOR BALANCING BATTERY CELLS

RELATED UNITED STATES PATENT APPLICATION

This application is a Continuation Application of the commonly-owned U.S. Patent Application with Ser. No. 12/613,333, filed on Nov. 5, 2009, now U.S. Pat. No. 8,148,942, which is hereby incorporated by reference in its entirety.

BACKGROUND

In a conventional charging system that is used to charge a battery pack, multiple bypasses may be coupled to the cells in the battery pack, so as to balance the cells. For example, if one of the cells has a voltage that is greater than the voltages of all the other cells, a corresponding bypass can be turned on so as to discharge the cell that has the highest voltage. By selectively turning on the bypasses according to the voltages of the cells, the cells can be balanced. However, power losses through the bypasses may be relatively high. In addition, a bypass controller is needed to control the bypasses according to feedback signals indicative of the voltages of the cells, which may increase the time needed to balance the cells, and may further increase power losses.

SUMMARY

In one embodiment, a power converter includes a primary winding and multiple secondary windings. The primary winding receives an input power. The multiple secondary windings transform the input power into multiple charging currents to charge a set of cells via a set of paths. The multiple secondary windings further balance the set of cells based on the charging currents. A ratio between a first turn number of a first secondary winding of the secondary windings and a second turn number of a second secondary winding of the secondary windings is determined by a nominal voltage ratio between two corresponding cells of the set of cells.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a charging system for charging a set of battery cells. During the charging, the set of cells can be balanced automatically. More specifically, the charging system includes a power converter, e.g., a transformer, to transform an input power into multiple charging currents. Meanwhile, each of the charging currents varies according to a voltage across a corresponding cell, such that the cells can be balanced relative to one another. After the cells are balanced, the charging system further adjusts the sum of the charging currents by controlling the input power according to the voltage across each cell.

Figure 1A:
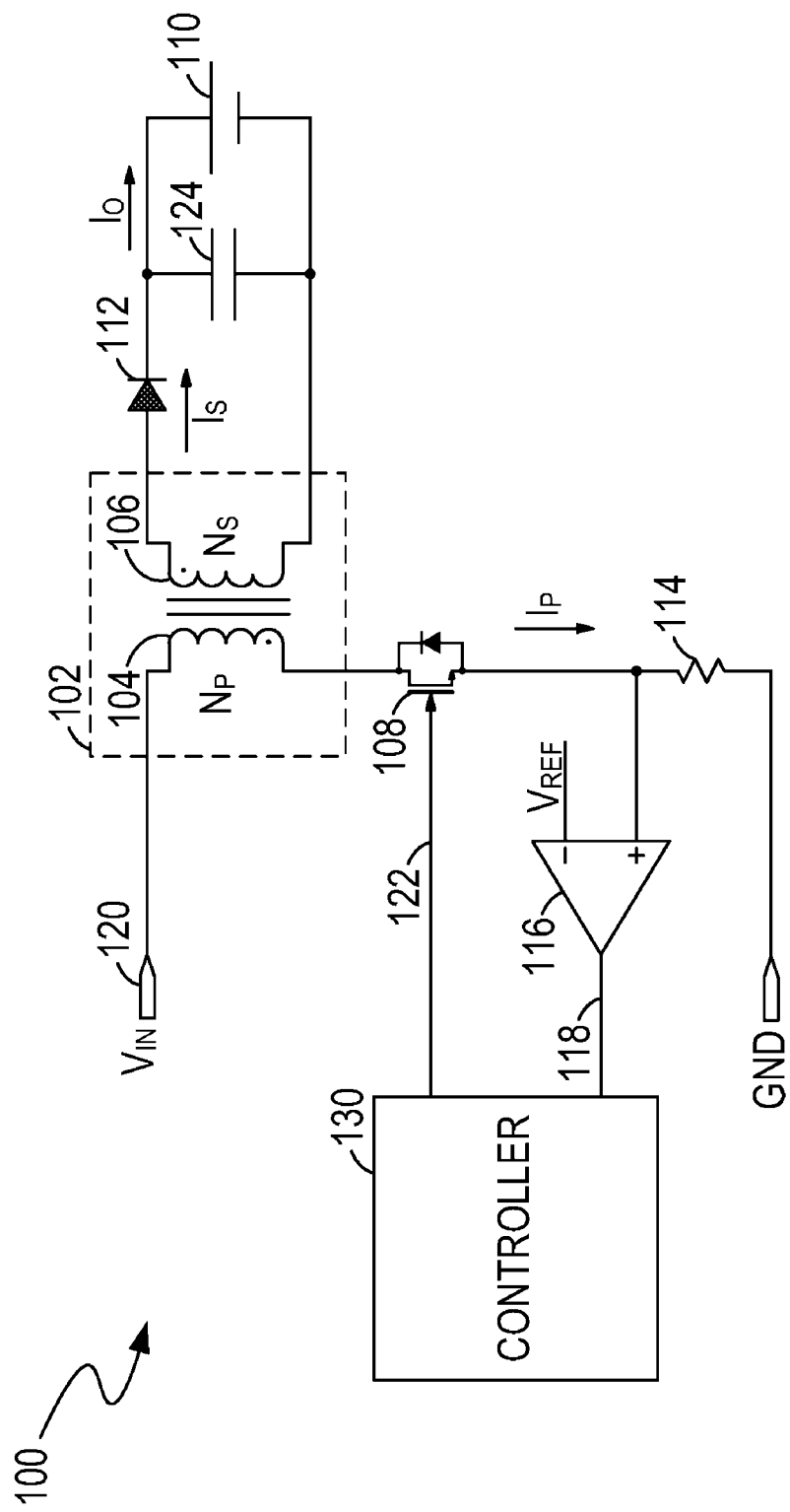
FIG. 1A illustrates a block diagram of an example of a power converter, in accordance with one embodiment of the present invention.

FIG. 1A illustrates a block diagram of an example of a power converter 100, in accordance with one embodiment of the present invention. The power converter 100 can be, but is not limited to, a flyback converter. Specifically, the power converter 100 includes a transformer 102. The transformer 102 has a primary winding 104 coupled between a supply terminal 120 and ground via a switch 108. In addition, the transformer 102 has a secondary winding 106 coupled in parallel with a capacitor 124 and a load 110 via a diode 112. The load 110 can be, but is not limited to, a rechargeable battery.

In one embodiment, a current sensor, e.g., a resistor 114, is coupled in series to the primary winding 104, such that a voltage $V_{114}$ across the resistor 114 indicates an input current $I_P$ flowing through the primary winding 104, e.g., $V_{114}=I_P*R_{114}$, where $R_{114}$ represents the resistance of the resistor 114. A comparator 116 compares the voltage $V_{114}$ with a reference voltage $V_{REF}$ and generates a comparison result signal 118 to a controller 130. The controller 130 generates a control signal 122 to control the switch 108 according to the comparison.

The supply terminal 120 can be coupled to a power source (not shown in FIG. 1A) having a voltage $V_{IN}$. When the switch 108 is turned on by the control signal 122, an input current $I_P$ can flow through the primary winding 104 from the supply terminal 120 to ground. Meanwhile, the diode 112 is reverse biased (cut off), and the secondary winding 106 receives energy from the primary winding 104. When the switch 108 is turned off, the input current $I_P$ becomes zero. Meanwhile, the diode 112 is forward biased (turned on). Thus, the energy received by the secondary winding 106 is transformed into an output current $I_S$, and the battery 110 can be charged by a charging current $I_O$. The charging current $I_O$ can be equal to an equivalent current $I_{SEQV}$ of the output current $I_S$.

Figure 1B:
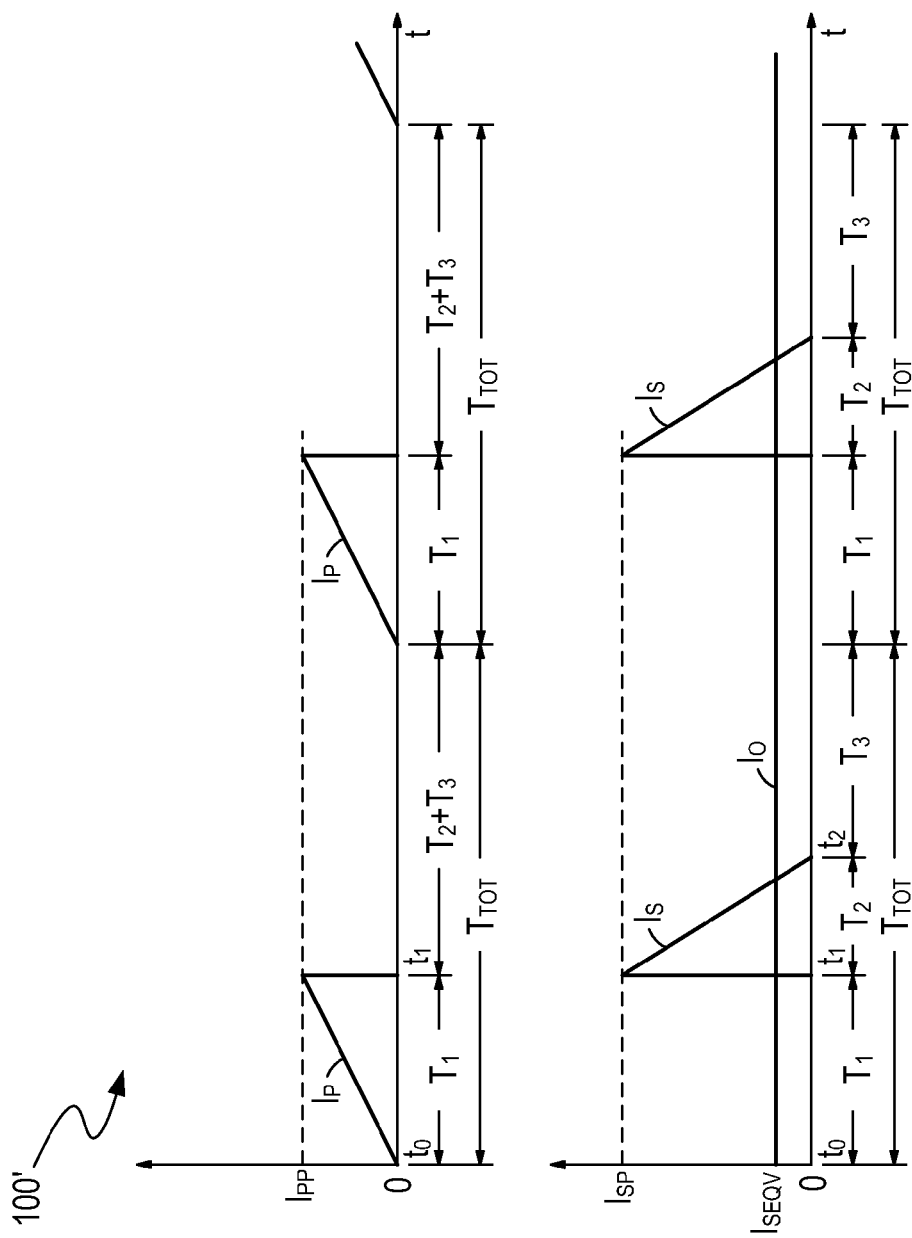
FIG. 1B illustrates an example of a plot for an input current, an output current and a charging current, in accordance with one embodiment of the present invention.

FIG. 1B illustrates an example of a plot 100' for the input current $I_P$, the output current $I_S$, and the charging current $I_O$, in accordance with one embodiment of the present invention. FIG. 1B is described in combination with FIG. 1A.

As shown in FIG. 1B, the switch 108 is turned on at a time point $t_0$ so that the input current $I_P$ increases from zero to a peak current level $I_{PP}$ during a first duration $T_1$. In one embodiment, compared with the voltage $V_{IN}$ at the supply terminal 120, the voltage $V_{114}$ on the resistor 114 is relatively small and can be neglected. Thus, the peak current level $I_{PP}$ can be given by:

$$I_{PP} \approx \frac{V_{IN} \times T_1}{L_P}, \tag{1}$$

where $L_P$ represents the inductance of the primary winding 104. During the first duration $T_1$, the input energy $E_{IN}$ of the transformer 102 is given by:

$$E_{IN} = \frac{I_{PP}^2 \times L_P}{2}. \tag{2}$$

When the first duration $T_1$ expires (e.g., at a time point $t_1$), the switch 108 is turned off. During a second duration $T_2$, the output current $I_S$ flowing through the secondary winding 106 can decrease from a peak current level $I_{SP}$ to zero. If $n_P$ is the turn number of the primary winding 104, and $n_S$ is the turn number of the secondary winding 106, the peak current level $I_{SP}$ can be given by:

$$I_{SP} = I_{PP} \times \frac{n_P}{n_S}. \tag{3}$$

Furthermore, when the output current $I_S$ decreases to zero (e.g., at a time point $t_2$), the switch 108 is still off for a third duration $T_3$. During the third duration $T_3$, the diode 112 is cut off and the output current $I_S$ is zero.

$T_{TOT}$ is the total duration of the durations $T_1$, $T_2$ and $T_3$, e.g., $T_{TOT}=T_1+T_2+T_3$. In one embodiment, the input current $I_P$ increases from zero to the peak current level $I_{PP}$ during the first duration $T_1$, and is zero during the second duration $T_2$ and the third duration $T_3$. Thus, an equivalent current $I_{PEQV}$ of the input current $I_P$ during the total duration $T_{TOT}$ is given by:

$$I_{PEQV} = \left(\frac{I_{PP}}{2}\right) \times \left(\frac{T_1}{T_{TOT}}\right). \tag{4}$$

Similarly, the output current $I_S$ is zero during the first duration $T_1$, decreases from the peak current $I_{SP}$ level to zero during the second duration $T_2$, and is zero during the third duration $T_3$. Thus, the equivalent current $I_{SEQV}$ of the output current $I_S$ during the total duration $T_{TOT}$ is given by:

$$I_{SEQV} = \left(\frac{I_{SP}}{2}\right) \times \left(\frac{T_2}{T_{TOT}}\right). \tag{5}$$

The charging current $I_O$ flowing to the battery 110 can be equal to the equivalent current $I_{SEQV}$ of the output current $I_S$, e.g., $I_O=I_{SEQV}$. Thus, based on equations (3) and (5), the charging current $I_O$ is given by:

$$I_O = \left(\frac{n_P}{n_S}\right) \times \left(\frac{I_{PP}}{2}\right) \times \left(\frac{T_2}{T_{TOT}}\right). \tag{6}$$

Returning to FIG. 1A, $V_O$ is the voltage across the battery 110 and $V_D$ is the forward bias voltage of the diode 112. If $E_{OUT}$ is the output energy transferred to the diode 112 and the battery 110 in the total duration $T_{TOT}$, the output energy $E_{OUT}$ is given by:

$$E_{OUT}=(V_O+V_D) \times I_{SEQV} \times T_{TOT}=(V_O+V_D) \times I_O \times T_{TOT}. \tag{7}$$

Assume that $\eta$ is the energy transformation efficiency of the input energy $E_{IN}$ into the output energy $E_{OUT}$, e.g., $E_{OUT}=\eta \times E_{IN}$. In one embodiment, the dissipation for the energy transformation can be relatively small and can be neglected. Thus, the energy transformation efficiency $\eta$ can be considered to be equal to 1, e.g., $\eta=1$. The output energy $E_{OUT}$ can be considered to be equal to the input energy $E_{IN}$, e.g., $E_{OUT}=E_{IN}$. According to equations (2) and (7), the following equation is obtained:

$$I_O = \frac{I_{PP}^2 \times L_P \times f_{SW}}{2 \times (V_O + V_D)}, \tag{8}$$

where $f_{SW}$ represents the switching frequency of the switch 108 and is equal to $1/T_{TOT}$. Based on equations (1) and (4), equation (8) is rewritten as:

$$I_O = \frac{I_{PEQV} \times V_{IN}}{V_O + V_D}. \tag{9}$$

The controller 130 can adjust or maintain the charging current $I_O$ to a specified level by adjusting the input current $I_P$ according to the variation of the battery voltage $V_O$. Specifically, the voltage $V_O$ across the battery 110 may vary during charging and discharging operations. A battery monitor (not shown in FIG. 1A) monitors the battery voltage $V_O$ and generates a feedback signal indicative of the battery voltage $V_O$ to the controller 130. Based on equation (8), the controller 130 increases the peak current level $I_{PP}$ as the battery voltage $V_O$ increases, and decreases the peak current level $I_{PP}$ as the battery voltage $V_O$ decreases.

More specifically, the controller 130 generates an internal clock signal (not shown in FIG. 1A) having a predetermined frequency, e.g., $f_{SW}$. In one embodiment, the switch 108 is an n-channel metal-oxide-semiconductor field-effect transistor (NMOSFET). The control signal 122 is set logically high in response to each pulse, e.g., each rising edge, of the internal clock signal. In addition, the control signal 122 is set logically low in response to each pulse, e.g., each rising edge, of the comparison result signal 118. For example, when a rising edge of a pulse of the internal clock signal occurs at the time point $t_0$ (shown in FIG. 1B), the switch 108 is turned on by a logically high control signal 122, and the input current $I_P$ starts to increase, e.g., from zero. At the time point $t_1$, the input current $I_P$ increases to a level $V_{REF}/R_{114}$, e.g., the voltage $V_{114}$ across the resistor 114 increases to the reference voltage $V_{REF}$, therefore the comparator 116 outputs a logically high comparison result signal 118. Accordingly, the switch 108 is turned off by a logically low control signal 122, and the input current $I_P$ becomes zero. At the time point $t_2$, a clock cycle $T_{TOT}$ of the internal clock signal expires, therefore a rising edge of another pulse of the internal clock signal occurs. Accordingly, the switch 108 is turned on again. Thus, during each clock cycle $T_{TOT}$, the peak current level $I_{PP}$ is adjusted to the level $V_{REF}/R_{114}$, e.g., $I_{PP}=V_{REF}/R_{114}$. Assume $I_{PRE}$ is a predefined/desirable current level of the charging current $I_O$. Based on equation (8), the following equation is obtained:

$$I_{PRE} = \frac{(V_{REF}/R_{114})^2 \times L_P \times f_{SW}}{2 \times (V_O + V_D)}. \quad (10)$$

Equation (10) is rewritten as:

$$V_{REF}^2 = \frac{2 \times R_{114}^2 \times I_{PRE} \times (V_O + V_D)}{L_P \times f_{SW}}. \quad (11)$$

The controller 130 sets the reference voltage $V_{REF}$ based on equation (11), such that the charging current $I_O$ is adjusted to the level $I_{PRE}$, e.g., $I_O=I_{PRE}$. Based on equation (9), the controller 130 can also increase the equivalent current $I_{PEQV}$ as the battery voltage $V_O$ increases, and decrease the equivalent current $I_{PEQV}$ as the battery voltage $V_O$ decreases, such that the charging current $I_O$ is adjusted to or maintained at the level $I_{PRE}$.

In the example of FIG. 1A, the primary winding 104 is coupled to ground via the switch 108 that is an NMOSFET. However, in another embodiment, the primary winding 104 is coupled to the supply terminal 120 via a switch (not shown in FIG. 1A) that is a p-channel MOSFET (PMOSFET), and the NMOSFET 108 is omitted. The PMOSFET can be controlled by the control signal 122. In one such embodiment, the control signal 122 is set logically low in response to each pulse of the internal clock signal, and is set logically high in response to each pulse of the comparison result signal 118.

Figure 2:
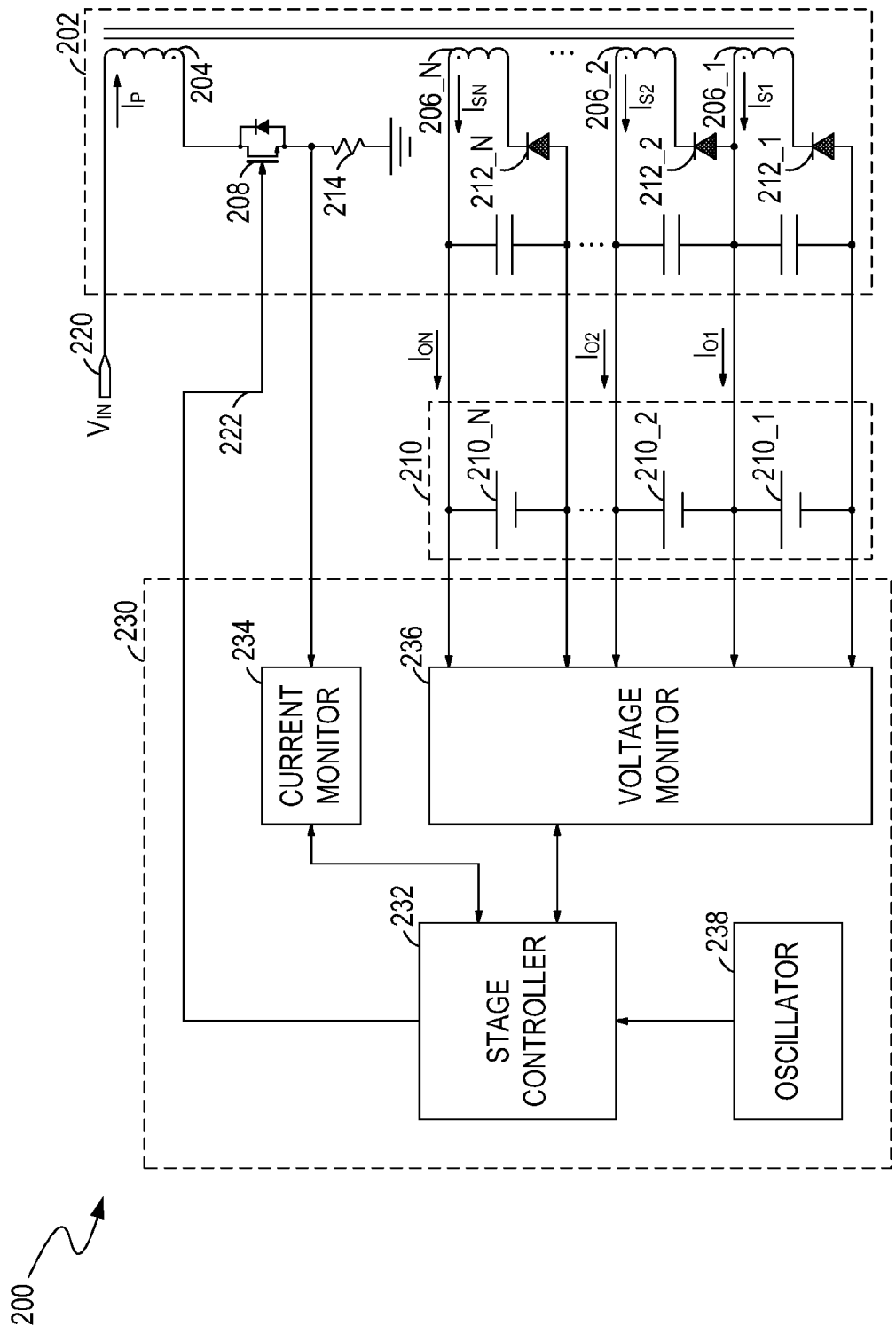
FIG. 2 illustrates a block diagram of an example of a charging system, in accordance with one embodiment of the present invention.

FIG. 2 illustrates a block diagram of an example of a charging system 200 for charging a battery pack 210, in accordance with one embodiment of the present invention. The battery pack 210 includes a set of series-coupled cells 210_1, 210_2, ... 210_N. The charging system 200 includes a controller 230 and a power converter 202, e.g., a transformer. The power converter 202 can provide multiple charging currents $I_{O1}, I_{O2}, ... I_{ON}$ to charge the set of cells 210_1-210_N respectively via a set of paths 212_1, 212_2, ... 212_N, e.g., a set of diodes.

The power converter 202 includes a primary winding 204 and multiple secondary windings 206_1, 206_2, ... 206_N. The primary winding 204 is coupled between a supply terminal 220 and ground via an input switch 208 and receives an input power from the supply terminal 220. The secondary windings 206_1-206_N are respectively coupled in parallel with the cells 210_1-210_N and are used to transform the input power into the charging currents $I_{O1}$-$I_{ON}$ to charge the cells 210_1-210_N respectively via the paths 212_1-212_N. Furthermore, the secondary windings 206_1-206_N can balance cell voltages $V_{O1}, V_{O2}, ... V_{ON}$ of the cells 210_1-210_N based on the charging currents $I_{O1}$-$I_{ON}$.

Specifically, the turn ratio between a first turn number of a first secondary winding (that is, the number of turns in the first secondary winding) of the secondary windings 206_1-206_N and a second turn number of a second secondary winding (that is, the number of turns in the second secondary winding) of the secondary windings 206_1-206_N is determined by, e.g., is approximately equal to, a nominal voltage ratio between two corresponding cells of the cells 210_1-210_N. As used herein, "approximately equal to" means that a difference between a turn ratio and a corresponding nominal voltage ratio is permissible so long as the difference is relatively small and can be ignored. For example, if $n_{206\_A}$ is the turn number of the secondary winding 206_A and $n_{206\_B}$ is the turn number of the secondary winding 206_B (A=1, 2, ... N; B=1, 2, ... N; and A≠B), the ratio between the turn number $n_{206\_A}$ and the turn number $n_{206\_B}$ is equal to $n_{206\_A}/n_{206\_B}$. If $V_{NOM\_A}$ is the nominal voltage of the cell 210_A and $V_{NOM\_B}$ is the nominal voltage of the cell 210_B, the nominal voltage ratio between the cells 210_A and 210_B is equal to $V_{NOM\_A}/V_{NOM\_B}$. The turn ratio $n_{206\_A}/n_{206\_B}$ is equal to the nominal voltage ratio $V_{NOM\_A}/V_{NOM\_B}$, e.g., $n_{206\_A}/n_{206\_B}=V_{NOM\_A}/V_{NOM\_B}$. As used herein, "a nominal voltage" of a cell is a voltage across the cell when the cell is fully charged. In other words, "a nominal voltage" of a cell is equal to a voltage across the cell when the cell is being charged in a constant-voltage charging mode and the charging current is less than a predetermined threshold.

As shown in FIG. 2, each path 212_1-212_N includes a diode coupled in series to a corresponding secondary winding 206_1-206_N and a corresponding cell 210_1-210_N. In one embodiment, the cells 210_1-210_N have the same nominal voltage, e.g., $V_{NOM}$. For example, each cell 210_1-210_N is made of the same material in the same way. In one such embodiment, the secondary windings 206_1-206_N have the same turn number, e.g., $n_{206}$. When the switch 208 that is coupled in series to the primary winding 204 is turned on, the diode in each path 212_1-212_N is reverse biased (cut off), therefore each path 212_1-212_N is disabled. Meanwhile, each secondary winding 206_1-206_N receives energy from the primary winding 204 due to the input current $I_P$ flowing through the primary winding 204. Each of the energies received by the secondary windings 206_1-206_N can be the same due to the same turn number $n_{206}$. When the switch 208 is turned off, the diode in each path 212_1-212_N is forward biased (turned on), therefore each path 212_1-212_N is enabled. Meanwhile, each secondary winding 206_1-206_N transforms the energy into a corresponding charging current $I_{O1}$, or $I_{O2}$, ... or $I_{ON}$.

Advantageously, in one such embodiment, if a first voltage across a first cell (e.g., the voltage $V_{O1}$ across the cell 210_1) is greater than a second voltage across a second cell (e.g., the cell voltage $V_{O2}$ across the cell 210_2), the first charging current for charging the first cell (e.g., the charging current $I_{O1}$) is less than the second charging current for charging the second cell (e.g., the charging current $I_{O2}$). Thus, the first cell voltage $V_{O1}$ increases slower than the second cell voltage $V_{O2}$. Contrarily, if the first cell voltage $V_{O1}$ is less than the second cell voltage $V_{O2}$, the first charging current $I_{O1}$ is greater than the second charging current $I_{O2}$, therefore the first cell voltage $V_{O1}$ increases faster than the second cell voltage $V_{O2}$. In other words, the charging currents $I_{O1}$-$I_{ON}$ can be automatically adjusted according to the cell voltages $V_{O1}$-$V_{ON}$ of the cells 210_1-210_N. As a result, the cell voltages $V_{O1}$-$V_{ON}$ can be adjusted to the same voltage level. The cell voltages $V_{O1}$-$V_{ON}$ as well as the charging currents $I_{O1}$-$I_{ON}$ can be balanced. In one such embodiment, the conventional bypasses and the conventional bypass controller are omitted, which reduces the power consumption of the charging system 200. In addition, the time needed for cell balancing can be reduced.

More specifically, in one such embodiment, since the secondary windings 206_1-206_N have the same turn number $n_{206}$, voltages $V_{S1}, V_{S2}, \ldots V_{SN}$ respectively across the secondary windings 206_1-206_N have the same peak voltage level, e.g., $V_{SP}$. $T'_2$ is the time (duration) needed for the output current $I_{S1}$ of the secondary winding 206_1 to decrease from the peak current level $I_{SP}$ to zero, and $T''_2$ is the time (duration) needed for the output current $I_{S2}$ of the secondary winding 206_2 to decrease from the peak current level $I_{SP}$ to zero. If the cell voltage $V_{O1}$ is greater than the cell voltage $V_{O2}$, the difference between $V_{O1}$ and $V_{SP}$ is less than the difference between $V_{O2}$ and $V_{SP}$. Thus, the cell voltage $V_{O1}$ and the voltage $V_{S1}$ across the secondary winding 206_1 can be balanced faster than the cell voltage $V_{O2}$ and the voltage $V_{S2}$ across the secondary winding 206_2 do. In other words, the duration $T'_2$ is shorter than the duration $T''_2$. Similarly, the duration $T'_2$ is longer than the duration $T''_2$ if the cell voltage $V_{O1}$ is less than the cell voltage $V_{O2}$. According to equation (6), the charging current $I_O$ is directly proportional to the second duration $T_2$. Similarly, the charging current $I_{O1}$ is directly proportional to the duration $T'_2$, and the charging current $I_{O2}$ is directly proportional to the duration $T''_2$. Thus, the charging current $I_{O1}$ is less than the charging current $I_{O2}$ if the cell voltage $V_{O1}$ is greater than the cell voltage $V_{O2}$, and is greater than the charging current $I_{O2}$ if the cell voltage $V_{O1}$ is less than the cell voltage $V_{O2}$.

The controller 230 is coupled to the input switch 208, and controls the secondary windings 206_1-206_N to transform the input power into the charging currents $I_{O1}-I_{ON}$ by controlling the switch 208. As shown in FIG. 2, the controller 230 includes a current monitor 234 coupled to a current sensor, e.g., a sense resistor 214, to monitor the input current $I_P$. The controller 230 also includes a voltage monitor 236 coupled to the cells 210_1-210_N to monitor the cell voltages $V_{O1}-V_{ON}$. The controller 230 further includes a stage controller 232 that samples/receives current information indicative of the input current $I_P$ from the current monitor 234 and voltage information indicative of the cell voltages $V_{O1}-V_{ON}$ from the voltage monitor 236. The stage controller 232 can generate a pulse width modulation (PWM) signal 222 to control the switch 208 according to the current information and the voltage information. An oscillator 238 can provide a clock signal to the stage controller 232 for operations of the stage controller 232. For example, the stage controller 232 can sample the current information and the voltage information at each rising/falling edge of the clock signal. In addition, the stage controller 232 can set the control signal 222 logically high in response to each pulse of the clock signal. The stage controller 232 can also set the control signal 222 logically low in response to a feedback signal, e.g., from the current monitor 234, that indicates the input current $I_P$ is equal to or greater than a predetermined level.

$P_{Oi}$ is the power transferred to the cell 210_i (i=1, 2, ... N), e.g., $P_{Oi}=V_{Oi}*I_{Oi}$, and $I_{SUM}$ is the sum of the charging currents $I_{O1}-I_{ON}$, e.g., $$I_{SUM} = \sum_{i=1}^{N} I_{Oi}.$$

The sum $I_{SUM}$ can be given by:

$$I_{SUM}=I_{O1}+I_{O2}\ldots+I_{ON}=(P_{O1}/V_{O1})+(P_{O2}/V_{O2})\ldots+(P_{ON}/V_{ON}) \quad (12)$$

When the cell voltages $V_{O1}-V_{ON}$ are balanced relative to one another, each cell voltage $V_{O1}-V_{ON}$ is approximately equal to an average voltage $V_{OAVE}$ of the cell voltages $V_{O1}-V_{ON}$, e.g., $V_{O1}=V_{O2}\ldots=V_{ON}=V_{OAVE}=(V_{O1}+V_{O2}\ldots+V_{ON})/N$. Thus, equation (12) can be rewritten as:

$$I_{SUM} = (P_{O1} + P_{O2}\ldots + P_{ON})/V_{OAVE} \quad (13)$$
$$= \sum_{i=1}^{N}(V_{Oi} \times I_{Oi})/V_{OAVE}.$$

As used herein, "approximately equal to" means that a difference between each cell voltage $V_{O1}-V_{ON}$ and the average voltage $V_{OAVE}$ is permissible so long as the difference is relatively small and can be ignored.

If $E'_{OUT}$ is the output energy transferred to the diodes 212_1-212_N and the cells 210_1-210_N in the duration $T_{TOT}$, the output energy $E'_{OUT}$ is given by:

$$E'_{OUT} = \left[ \begin{array}{c} (V_{O1}+V_D)\times I_{O1}+(V_{O2}+V_D)\times \\ I_{O2}+\ldots(V_{ON}+V_D)\times I_{ON} \end{array} \right] \times T_{TOT} \quad (14)$$
$$= \left[ \sum_{i=1}^{N}(V_{Oi}\times I_{Oi}) + V_D \times \sum_{i=1}^{N} I_{Oi} \right] \times T_{TOT}$$
$$= (V_{OAVE} + V_D) \times I_{SUM} \times T_{TOT}.$$

Since the output energy $E'_{OUT}$ of the power converter 202 can be considered to be equal to the input energy $E_{IN}$ of the power converter 202, e.g., $E'_{OUT}=E_{IN}$, based on equations (2) and (14), the following equation can be obtained:

$$I_{SUM} = \frac{I_{PP}^2 \times L_P \times f_{SW}}{2 \times (V_{OAVE} + V_D)}. \quad (15)$$

The current monitor 234 can include a current sense comparator (similar to the comparator 116 shown in FIG. 1A) for comparing a sensing signal, e.g., a voltage $V_{214}$ across the sense resistor 214, indicative of the input current $I_P$ with a reference voltage $V_{REF}$. As such, the controller 230 can adjust the peak current level $I_{PP}$ to a level $V_{REF}/R_{214}$, e.g., $I_{PP}=V_{REF}/R_{214}$, where $R_{214}$ represents the resistance of the sense resistor 214. $I_{PRE}$ is a predefined/desirable current level of the sum $I_{SUM}$. Based on equation (15), the controller 230 can calculate the reference voltage $V_{REF}$ and set the reference voltage $V_{REF}$ according to the following equation:

$$V_{REF}^2 = \frac{2 \times R_{114}^2 \times I_{PRE} \times (V_{OAVE} + V_D)}{L_P \times f_{SW}}. \quad (16)$$

In other words, the controller 230 can adjust the input current $I_P$, e.g., adjust the reference voltage $V_{REF}$, according to the voltage ($V_{O1}$, or $V_{O2}$, ... or $V_{ON}$) of each cell 210_1-210_N, such that the sum $I_{SUM}$ is adjusted to or maintained at the desirable level $I_{PRE}$, e.g., $I_{SUM}=I_{PRE}$. In one such embodiment, since the charging currents $I_{O1}-I_{ON}$ are balanced relative to one another, all of the charging currents $I_{O1}-I_{ON}$ are adjusted to a level $I_{PRE}/N$.

Similar to the discussion in relation to FIG. 1A, according to equations (1) and (4), equation (15) is rewritten as:

$$I_{SUM} = \frac{I_{PEQV} \times V_{IN}}{V_{OAVE} + V_D}. \quad (17)$$

The controller 230 can also increase the equivalent current $I_{PEQV}$ as the average voltage $V_{OAVE}$ increases, and decrease the equivalent current $I_{PEQV}$ as the average voltage $V_{OAVE}$ decreases, such that the sum $I_{SUM}$ is adjusted to or maintained at the desirable level $I_{PRE}$.

In one embodiment, according to the cell voltages $V_{O1}$-$V_{ON}$ and the input current $I_P$, the charging system 200 operates in a selected mode, e.g., a precondition/pre-charge mode, a constant-current charging mode, a constant-voltage charging mode, a charging termination mode, etc.

For example, if any of the cell voltages $V_{O1}$-$V_{ON}$ is less than a first predetermined reference $V_{PRE1}$, the charging system 200 operates in a pre-charge mode. In the pre-charge mode, the controller 230 adjusts the peak current level $I_{PP}$ (or the equivalent current $I_{PEQV}$) of the input current $I_P$ to a relatively low level, such that the charging currents $I_{O1}$-$I_{ON}$ can be relatively small. In the example of FIG. 2, the switch 208 is an NMOSFET. Thus, the stage controller 232 adjusts the peak current level $I_{PP}$ (or the equivalent current $I_{PEQV}$) to a relatively low level by setting a duty cycle of the PWM signal 222 to be relatively low. In an alternate embodiment, a PMOSFET is coupled between the supply terminal 220 and the primary winding 204 and is controlled by the PWM signal 222. In one such embodiment, the NMOSFET 208 is omitted, and the primary winding 204 can be coupled to the sense resistor 214 directly. The stage controller 232 can set the duty cycle of the PWM signal 222 to be relatively high, so as to adjust the peak current level $I_{PP}$ (or the equivalent current $I_{PEQV}$) to a relatively low level. In yet another embodiment, the controller 230 adjusts the peak current level $I_{PP}$ to a relatively low level by setting the reference voltage $V_{REF}$ to a relatively low level.

If each cell voltage $V_{O1}$-$V_{ON}$ is greater than the first predetermined reference $V_{PRE1}$, and the average cell voltage $V_{OAVE}$ is less than a second predetermined reference $V_{PRE2}$ ($V_{PRE1} < V_{PRE2}$), the charging system 200 operates in a constant-current charging mode. In the constant-current charging mode, the stage controller 232 adjusts the input current $I_P$ according to the cell voltages $V_{O1}$-$V_{ON}$, so as to maintain the sum $I_{SUM}$ at a predefined current level $I_{PRE}$. For example, the reference voltage $V_{REF}$ is adjusted according to the cell voltages $V_{O1}$-$V_{ON}$ based on equation (16).

If the average cell voltage $V_{OAVE}$ is equal to or greater than the second predetermined reference $V_{PRE2}$, the charging system 200 operates in a constant-voltage charging mode. In the constant-voltage charging mode, the average cell voltage $V_{OAVE}$ remains substantially constant, e.g., equal to the second predetermined reference $V_{PRE2}$. Meanwhile, the stage controller 232 reduces the sum $I_{SUM}$ gradually (e.g., at a predetermined rate). For example, for the NMOSFET 208, the stage controller 232 reduces the duty cycle of the PWM signal 222 gradually. For the PMOSFET mentioned above, the stage controller 232 increases the duty cycle of the PWM signal 222 gradually. The stage controller 232 can also reduce the sum $I_{SUM}$ gradually by reducing the reference voltage $V_{REF}$ at a predetermined rate. Advantageously, the cell voltages $V_{O1}$-$V_{ON}$ can be balanced automatically during the pre-charge mode, the constant-current charging mode and the constant-voltage charging mode. As a result, each cell voltage $V_{O1}$-$V_{ON}$ can be approximately equal to the second predetermined reference $V_{PRE2}$. In one embodiment, the second predetermined reference $V_{PRE2}$ is equal to the nominal voltage $V_{NOM}$ of the cells 210_1-210_N.

Additionally, during the constant-voltage charging mode, if the sum $I_{SUM}$ decreases to a current threshold $I_{OTH}$ ($I_{OTH} < I_{PRE}$), the battery pack 210 can be considered to be fully charged, and the charging system 200 operates in a charging termination mode. In the charging termination mode, the stage controller 232 terminates the charging of the battery pack 210 by disabling the switch 208, in one embodiment. In another embodiment, the state controller 232 terminates the charging of the battery pack 210 by disconnecting the supply terminal 220 from the power source $V_{IN}$.

The charging system 200 can also operate in the charging termination mode if any undesirable condition (e.g., over-voltage condition, over-temperature condition) occurs. For example, if a cell of the cells 210_1-210_N has a cell voltage greater than a predetermined voltage threshold $V_{OTH}$ ($V_{PRE1} < V_{PRE2} < V_{OTH}$), then an over-voltage condition has occurred, and the controller 230 terminates the battery charging. For another example, a temperature sensor (not shown in FIG. 2) is used to sense the temperature of the battery pack 210. If the temperature of the battery pack 210 is greater than a predetermined temperature threshold, then an over-temperature condition has occurred, and the battery charging is terminated.

As discussed above, in one embodiment, the cells 210_1-210_N have the same nominal voltage $V_{NOM}$, and the secondary windings 206_1-206_N have the same turn number $n_{206}$. However, in another embodiment, the secondary windings 206_1-206_N may have different turn numbers.

In the example of FIG. 2, the cell 210_1 is a single cell. In another embodiment, the cell 210_1 can be a cell group that includes two sub-cells coupled in series (not shown in FIG. 2). Similarly, the cell 210_2 can be a cell group that includes three sub-cells coupled in series. Each of the sub-cells in the cell group 210_1 is the same as each of the sub-cells in the cell group 210_2. As such, the nominal voltage ratio between the nominal voltage $V_{NOM\_1}$ of the cell group 210_1 and the nominal voltage $V_{NOM\_2}$ of the pack cell 210_2 is equal to 2/3 (e.g., $V_{NOM\_1}/V_{NOM\_2}=2/3$). Compared with the nominal voltages $V_{NOM\_1}$ and $V_{NOM\_2}$, voltages on the diodes 212_1 and 212_2 are relatively small and can be neglected. The turn ratio $n_{206\_1}/n_{206\_2}$ between the secondary windings 206_1 and 206_2 is equal to $V_{NOM\_1}/V_{NOM\_2}$ (e.g., $n_{206\_1}/n_{206\_2}=2/3$). In one such embodiment, the sub-cells in the cell group 210_1 and the sub-cells in the cell group 210_2 can be balanced during a charging/balancing operation. Similarly, in one embodiment, each cell 210_1-210_N can be a cell group that includes a different number $N_{CELL}$ of identical sub-cells. The turn number of each secondary winding 206_1-206_N is chosen according to the cell number $N_{CELL}$ of sub-cells in a corresponding cell group 210_1-210_N. In one such embodiment, the sub-cells in the cell groups 210_1-210_N can be balanced relative to one another during the charging/balancing operation.

Figure 3:
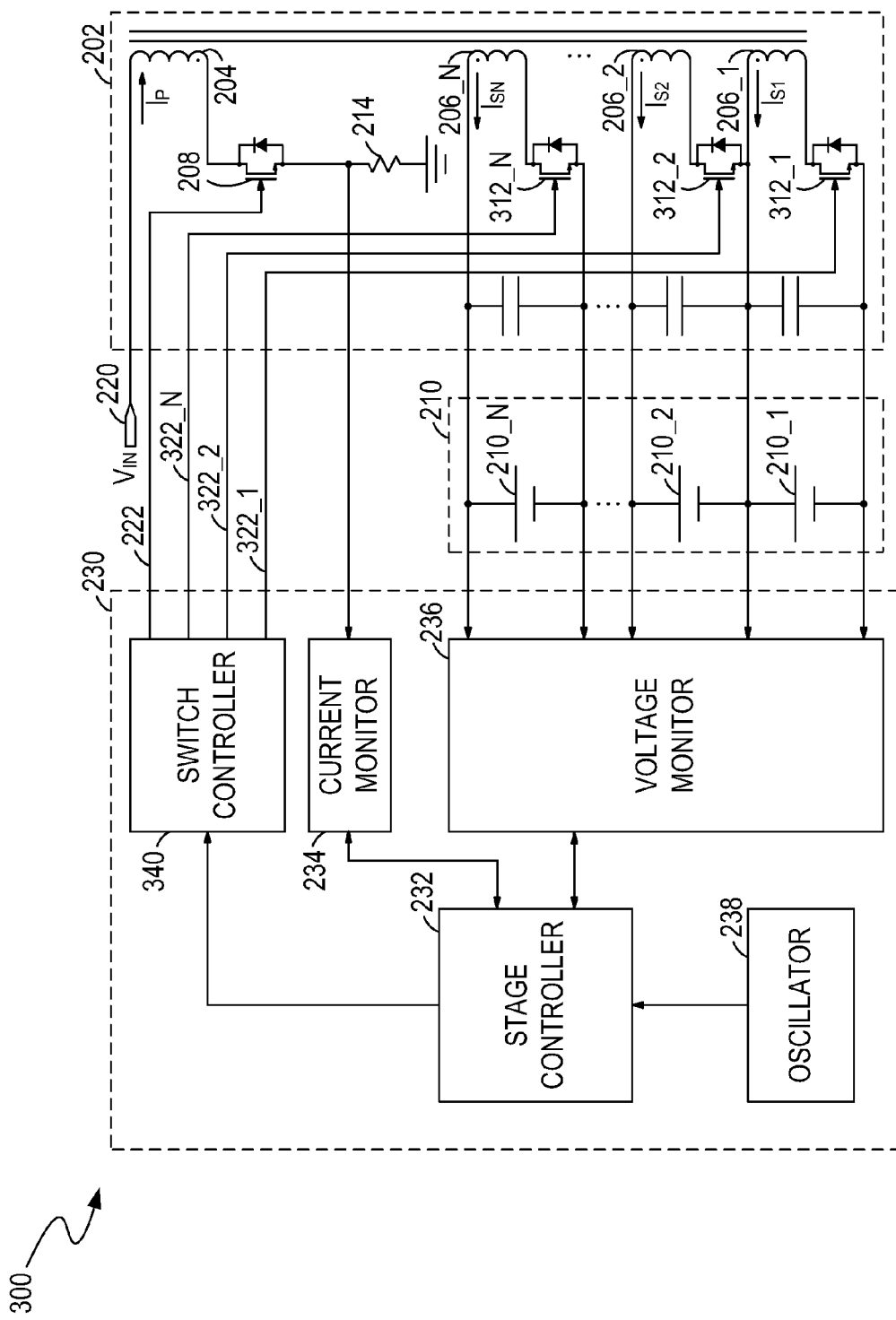
FIG. 3 illustrates a block diagram of an example of a charging system, in accordance with one embodiment of the present invention.

FIG. 3 illustrates another block diagram of an example of a charging system 300, in accordance with one embodiment of the present invention. Elements that are labeled the same as in FIG. 2 have similar functions. As shown in FIG. 3, the secondary windings 206_1-206_N are coupled to the cells 210_1-210_N respectively via a set of paths 312_1-312_N. Each path of the set of paths 312_1-312_N includes an output switch. Each output switch 312_1-312_N can be a MOSFET having a body diode. In one such embodiment, the body diodes in the MOSFETs 312_1-312_N have functions similar to those of the diodes 212_1-212_N in FIG. 2, and the diodes 212_1-212_N are omitted in FIG. 3. The controller 230 can further include a switch controller 340 for generating the control signal 222 to control the switch 208, and for generating control signals 322_1-322_N to control the switches 312_1-312_N.

In one embodiment, since the body diodes in the switches 312_1-312_N have functions similar to those of the diodes 212_1-212_N in FIG. 2, the switches 312_1-312_N can be turned off during a charging/balancing operation. More specifically, the switches 312_1-312_N are turned off whether the switch 208 is turned on or turned off.

In another embodiment, the switch controller 340 controls the output switches 312_1-312_N based on the state of the input switch 208. Specifically, the switches 312_1-312_N can be selectively turned on so as to reduce the time needed for cell balancing. For example, as mentioned above, during each clock cycle $T_{TOT}$, the switch 208 is turned on for a first duration $T_1$ and is turned off for a second duration $T_2$ and a third duration $T_3$. During the first duration $T_1$, the output switches 312_1-312_N are turned off. During the second duration $T_2$, if a cell 210_m (m=1, 2, . . . or N) has the lowest voltage among the cells 210_1-210_N, the switch controller 340 turns on the switch 312_m that is coupled to the cell 210_m. Thus, a voltage loss on the switch 312_m is reduced. The charging current $I_{Om}$, for charging the cell 210_m can increase. The switch controller 340 turns on the switch 312_m for a relatively short time, e.g., shorter than the second duration $T_2$, so as to prevent the cell 210_m from discharging to the secondary winding 206_m via the switch 312_m. For another example, if a cell 210_n (n=1, 2, . . . or N) has a voltage $V_{LOWER}$ that is lower than a predetermined voltage, e.g., an average cell voltage $V_{OAVE}$ of the cells 210_1-210_N, and the difference between the voltage $V_{LOWER}$ and the predetermined voltage $V_{OAVE}$ is greater than a voltage threshold $V_{DIF\_TH}$, the switch controller 340 turns on the switch 312_n that is coupled to the cell 210_n. Thus, the charging current $I_{On}$ for charging the cell 210_n can increase. Similarly, the switch controller 340 turns on the switch 312_n for a relatively short time to prevent the cell 210_n from discharging to the secondary winding 206_n via the switch 312_n. Consequently, the time needed for cell balancing can be reduced.

Furthermore, in another embodiment, when the switch 208 is turned on, the switches 312_1-312_N are turned off. When the switch 208 is turned off, the switches 312_1-312_N are turned on. Thus, voltage losses on the body diodes in the switches 312_1-312_N are reduced, and the time needed for cell balancing may also be reduced. In one such embodiment, when the switch 208 is turned off, the switches 312_1-312_N are turned on for a relatively short time to prevent the cells 210_1-210_N from discharging to the secondary windings 206_1-206_N via the switches 312_1-312_N.

Figure 4:
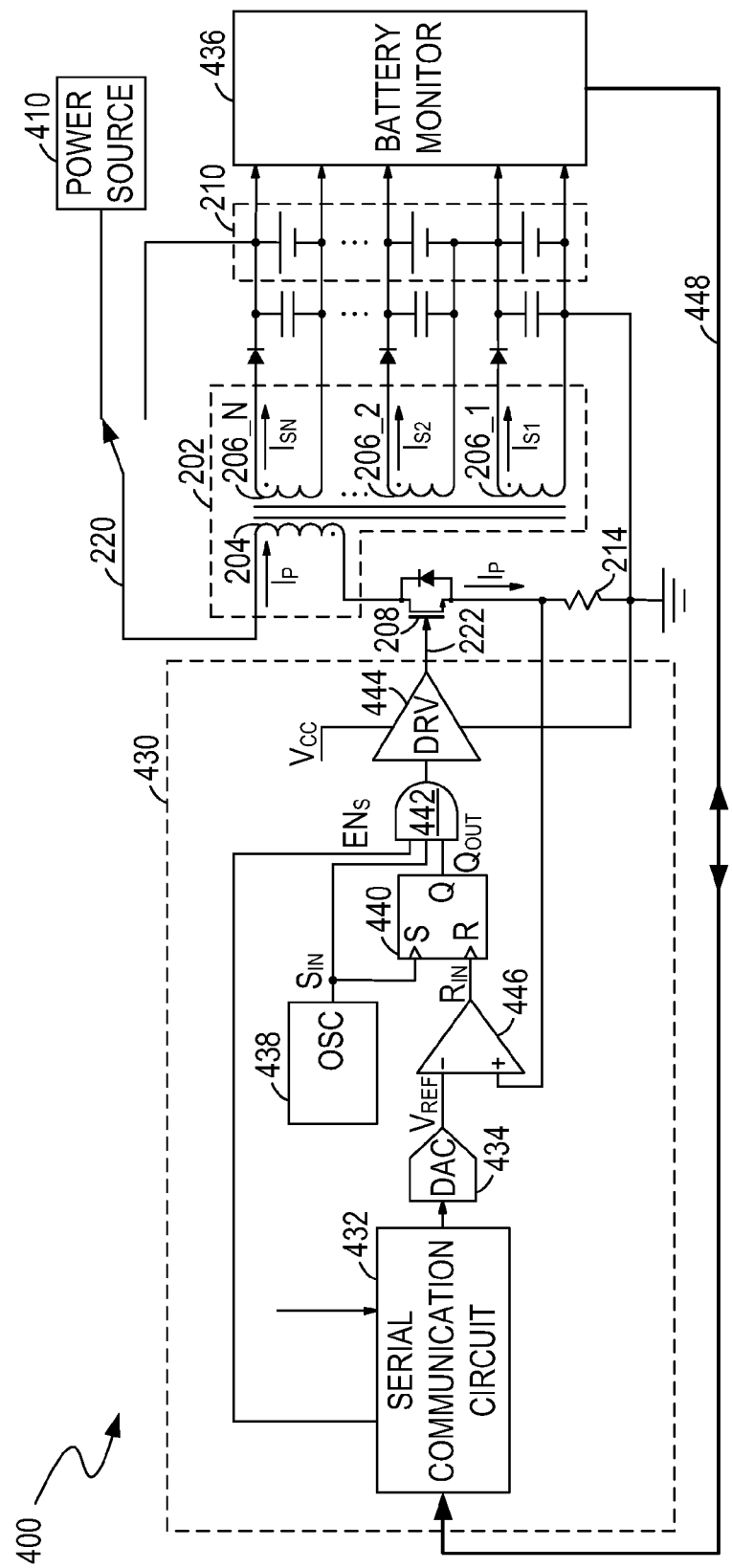
FIG. 4 illustrates a block diagram of an example of a charging system, in accordance with one embodiment of the present invention.

FIG. 4 illustrates another block diagram of an example of a charging system 400, in accordance with one embodiment of the present invention. Elements that are labeled the same as in FIG. 2 have similar functions. As shown in FIG. 4, the charging system 400 includes the power converter 202 and the battery pack 210. The charging system 400 also includes a battery monitor 436 for monitoring the cell voltages $V_{O1}$-$V_{ON}$ of the cells 210_1-210_N. Based on the cell voltages $V_{O1}$-$V_{ON}$, the battery monitor 436 calculates the reference voltage $V_{REF}$ and generates a reference signal indicative of the reference voltage $V_{REF}$ to a bus 448, e.g., a serial communication bus. The battery monitor 436 can further generate a control signal for enabling/disabling a battery charging process based on the cell voltages $V_{O1}$-$V_{ON}$ to the bus 448. The charging system 400 further includes a controller 430 for controlling the switch 208 based on the reference signal from the battery monitor 436 and the current information from the sense resistor 214.

More specifically, the controller 430 includes a serial communication circuit 432, a digital-to-analog converter (DAC) 434, a comparator 446, a reset-set (RS) flip flop 440, an oscillator 438, an AND gate 442, and a driver 444. The serial communication circuit 432 receives the reference signal via the bus 448 and outputs a digital signal indicative of the calculated reference voltage $V_{REF}$ to the DAC 434. The DAC 434 generates the reference voltage signal $V_{REF}$ to the comparator 446.

The comparator 446 compares the reference voltage $V_{REF}$ with the voltage $V_{214}$ across the sensor resistor 214, and generates a comparison result signal $R_{IN}$ to a reset terminal R of the RS flip flop 440. Additionally, the oscillator 438 generates a clock signal $S_{IN}$ to a set terminal S of the RS flip flop 440. The clock signal $S_{IN}$ has a predetermined frequency $f_{SW}$. In one embodiment, the RS flip flop 440 is triggered by rising edges of the signals $S_{IN}$ and $R_{IN}$. For example, the output signal $Q_{OUT}$ of the RS flip flop 440 is set logically high if a rising edge of a pulse of the signal $S_{IN}$ occurs, and is set logically low if a rising edge of a pulse of the signal $R_{IN}$ occurs. The AND gate 442 receives the output signal $Q_{OUT}$, the clock signal $S_{IN}$, and an enable signal $EN_S$ from the serial communication circuit 432. Thus, when the OSC 438 generates a pulse $S_{IN}$ to the RS flip flop 440 and the enable signal $EN_S$ is logically high, the AND gate 442 generates a logically high signal to the driver 444, turning on the switch 208. When the input current $I_P$ increases to the level $V_{REF}/R_{214}$, the comparator 446 generates a pulse $R_{IN}$ to the RS flip flop 440, therefore the AND gate 442 generates a logically low signal to the driver 444, turning off the switch 208. When a clock cycle $T_{TOT}$ of the clock signal $S_{IN}$ expires, the output signal $Q_{OUT}$ is set logically high again by another pulse $S_{IN}$.

In the example of FIG. 4, the input signals of the AND gate 442 include the clock signal $S_{IN}$. Thus, the duty cycle of the clock signal $S_{IN}$ is selected, e.g., to be relatively high (e.g., 50%, 60%), such that, during each clock cycle, the clock signal $S_{IN}$ will not become logically low before the comparator 446 generates a pulse $R_{IN}$ to the RS flip flop 440, e.g., before the input current $I_P$ increases to the level $V_{REF}/R_{214}$. As a result, the switch 208 is turned on when a rising edge of the clock signal $S_{IN}$ occurs and is kept on until a rising edge of the comparison result signal $R_{IN}$ occurs. Advantageously, if the comparator 446 is disabled or an undesirable condition (e.g., the comparator 446 is broken, or the DAC 434 is broken, etc.) occurs, the AND gate 442 can generate the output signal in accordance with the clock signal $S_{IN}$. The switch 208 is turned on periodically by the clock signal $S_{IN}$ such that the charging system 400 still operates properly.

Furthermore, if the cells 210_1-210_N are fully-charged, or if any undesirable condition (e.g., over-voltage condition, over-current condition, over-temperature condition) occurs, the battery monitor 436 generates a control signal to the serial communication circuit 432 via the bus 448, such that the enable signal $EN_S$ is set logically low to disable the switch 208.

The supply terminal 220 can receive power from different power sources. For example, the supply terminal 220 is coupled to a power source 410. The power source 410 can be, but is not limited to, an auxiliary power supply, a solar panel, etc. For another example, the supply terminal 220 is coupled to the battery pack 210. In this example, the power converter 202 receives energy from the plurality of cells 210_1-210_N and distributes the energy to the cells 210_1-210_N. The cells 210_1-210_N are balanced relative to one another based on the energy from the cells 210_1-210_N. As a result, cell voltages V'$_{O1}$-V'$_{ON}$ of the cells 210_1-210_N (after the balancing process) are substantially equal to the average voltage V$_{OAVE}$ of the cell voltages V$_{O1}$-V$_{ON}$ (before the balancing process), e.g., V'$_{O1}$=V'$_{O2}$ . . . =V$_{ON}$=V$_{OAVE}$.

Figure 5:
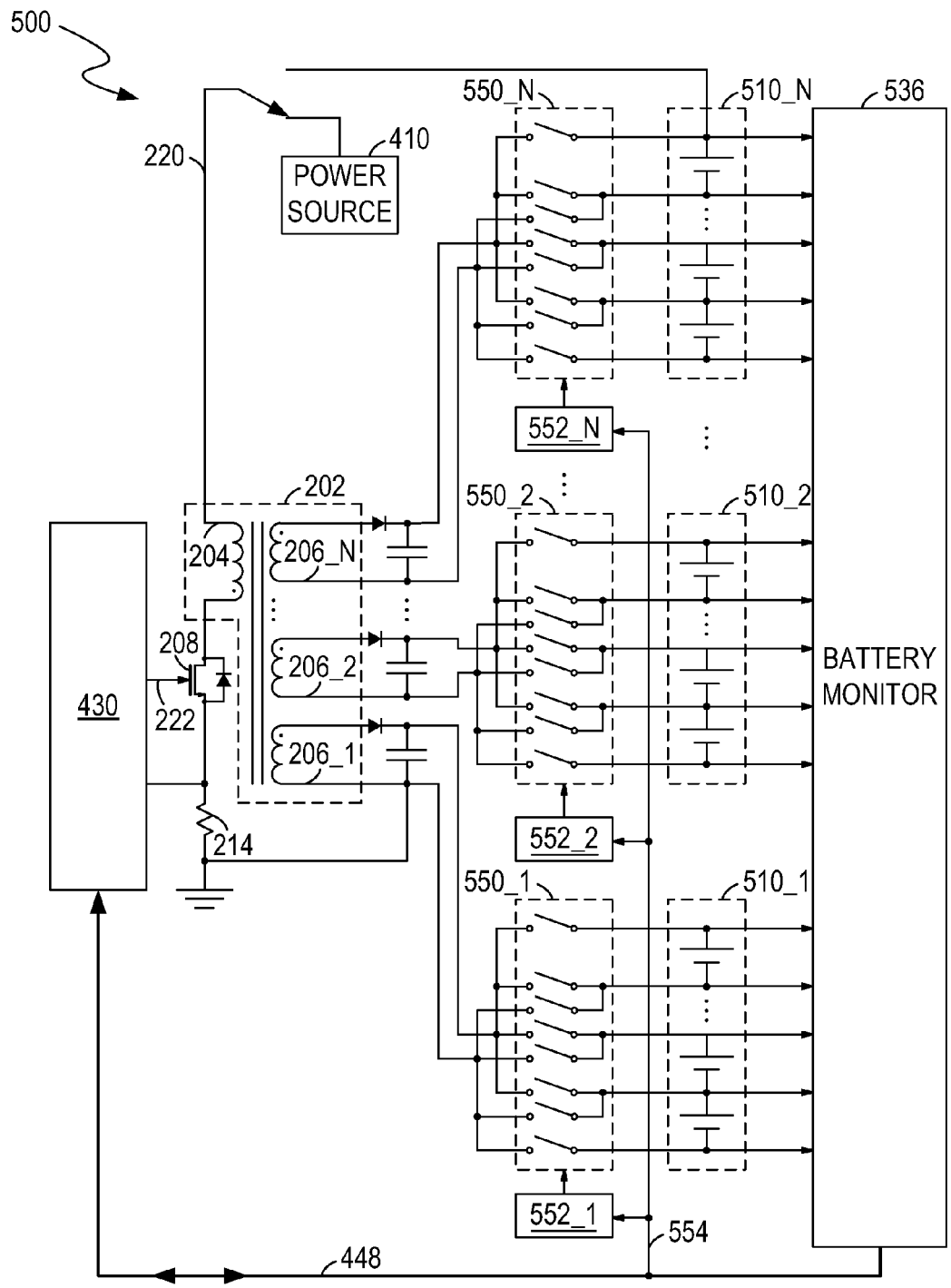
FIG. 5 illustrates a block diagram of an example of a charging system, in accordance with one embodiment of the present invention.

FIG. 5 illustrates another block diagram of an example of a charging system 500, in accordance with one embodiment of the present invention. Elements that are labeled the same as in FIG. 2 and FIG. 4 have similar functions. As shown in FIG. 5, the charging system 500 can charge/balance cells in multiple battery packs 510_1, 510_2, . . . 510_N.

More specifically, the secondary windings 206_1-206_N are coupled to the battery packs 510_1-510_N respectively via multiple switch matrixes 550_1, 550_2, . . . 550_N. Each battery pack 510_1-510_N includes multiple cells. Accordingly, each switch matrix 550_1-550_N includes multiple pairs of switches, and each pair of switches is used to connect/disconnect a corresponding cell to/from a corresponding secondary winding 206_1-206_N. Multiple switch controllers 552_1, 552_2, . . . 552_N, e.g., serial communication and power switch decoders, are used respectively to control switches in the switch matrixes 550_1-550_N based on a control signal 554 from the serial communication bus 448. The control signal 554 can be from a battery monitor 536 that monitors cells in the battery packs 510_1-510_N. Advantageously, by controlling the switch matrixes 550_1-550_N properly, cells in the battery packs 510_1-510_N can be balanced relative to one another.

For example, each switch controller 552_1-552_N can turn on the switch pairs sequentially in a corresponding switch matrixes 550_1-550_N, such that energies are transferred to cells sequentially in a corresponding battery pack 510_1-510_N. Each switch controller 552_1-552_N can also selectively turn on a pair of switches based on the statuses, e.g., cell voltages, of cells in a corresponding battery pack 510_1-510_N. For example, if a cell in a battery pack 510_k (k=1, 2, . . . N) has the lowest cell voltage among the cells in the battery pack 510_k, the switch controller 550_k turns on a corresponding pair of switches to transfer energy to the cell that has the lowest voltage. As a result, by selectively turning on the switches in the switch matrixes 550_1-550_N for multiple times, the cells in the battery packs 510_1-510_N can be balanced relative to one another.

In the example of FIG. 5, multiple separated switch controllers 552_1-552_N are used to control the switch matrixes 550_1-550_N. However, in another embodiment, a single switch controller (not shown in FIG. 5) can be used, instead of the separated switch controllers 552_1-552_N, to control all of the switch matrixes 550_1-550_N. In the example of FIG. 5, a single battery monitor 536 monitors all of the cells in the battery packs 510_1-510_N. However, in another embodiment, multiple separated battery monitors (not shown in FIG. 5) can be used instead, to monitor the cells in the battery packs 510_1-510_N respectively.

Figure 6:
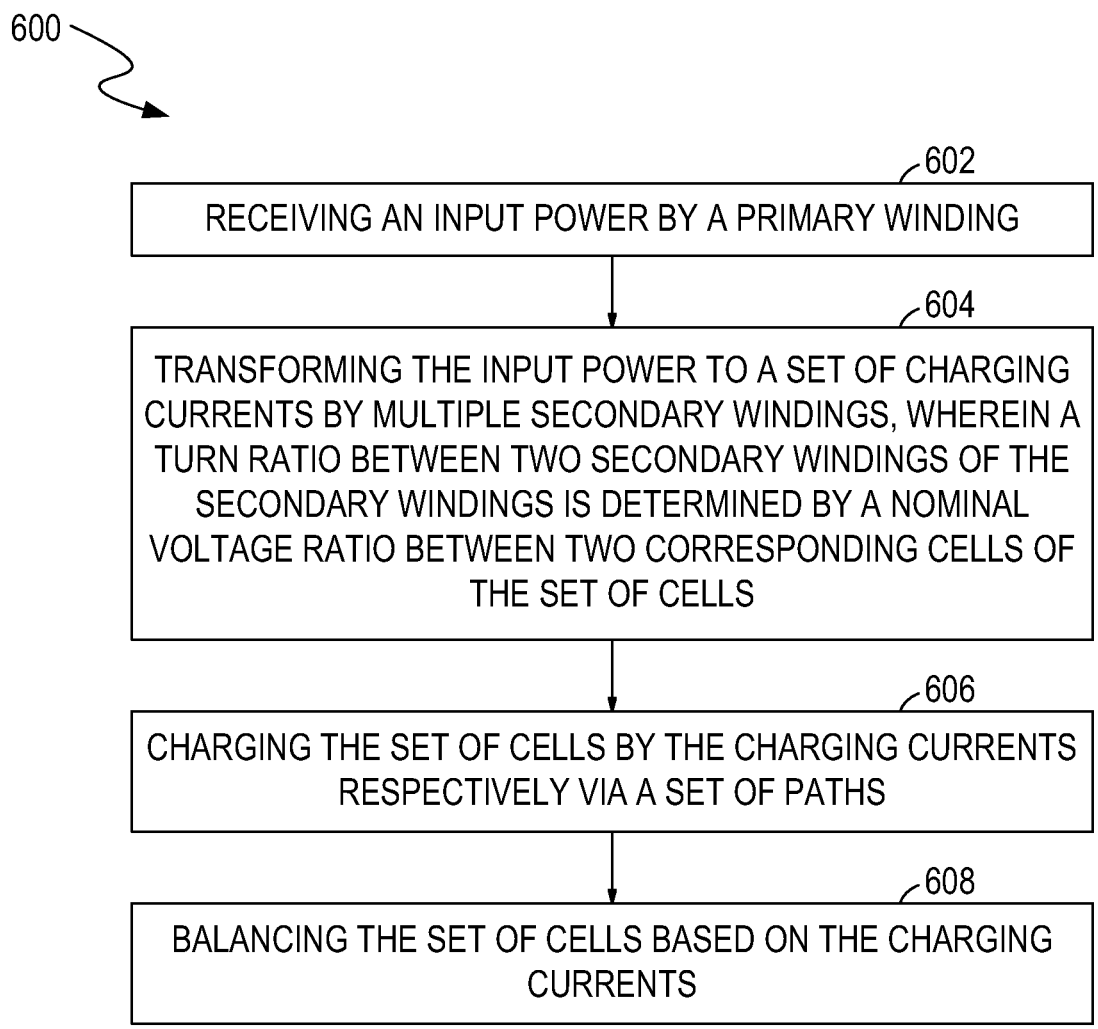
FIG. 6 illustrates a flowchart of examples of operations performed by a charging system, in accordance with one embodiment of the present invention.

FIG. 6 illustrates a flowchart 600 of examples of operations performed by a charging system (200, or 300, or 400, or 500), in accordance with one embodiment of the present invention. FIG. 6 is described in combination with FIG. 2, FIG. 3, FIG. 4 and FIG. 5.

In block 602, the primary winding 204 receives an input power from the supply terminal 220.

In block 604, multiple secondary windings 206_1-206_N transform the input power into multiple charging currents I$_{O1}$-I$_{ON}$. In one such embodiment, the ratio between a first turn number (e.g., n$_{206\_A}$) of a first secondary winding (e.g., 206_A) and a second turn number (e.g., n$_{206\_B}$) of a second secondary winding (e.g., 206_B) is determined by the nominal voltage ratio between two corresponding cells of the set of cells 210_1-210_N (A=1, 2, . . . N; B=1, 2, . . . N; and A≠B).

In block 606, the charging currents I$_{O1}$-I$_{ON}$ charge the set of cells 210_1-210_N respectively via the set of paths 212_1-212_N, e.g., a set of diodes.

In addition, as described in block 608, the set of cells 210_1-210_N are balanced based on the charging currents I$_{O1}$-I$_{ON}$.

In summary, embodiments according to the present invention provide a power converter and a charging system that uses the power converter. The power converter includes a primary winding coupled to a supply terminal and ground via an input switch. The power converter further includes multiple secondary windings coupled to a set of cells via a set of paths, e.g., including a set of diodes. By using the power converter, the charging system can charge the set of cells and at the same time balance the set of cells. Furthermore, the charging system can adjust the charging currents for the set of cells to a desirable level by controlling the input switch according to the voltages across the cells.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system comprising:
    a primary winding configured to receive an input power; and
    a plurality of secondary windings configured to transform said input power into a plurality of currents to balance a plurality of cells in a battery pack, wherein a ratio between a first turn number of a first secondary winding of said secondary windings and a second turn number of a second secondary winding of said secondary windings is determined by a nominal voltage ratio between two corresponding cells of said plurality of cells.

2. The system as claimed in claim 1, wherein said ratio between said first turn number and said second turn number is approximately equal to said nominal voltage ratio between said two corresponding cells.

3. The system as claimed in claim 1, wherein said cells are charged by said currents, and wherein a current for charging a first cell of said cells is less than a current for charging a second cell of said cells if a voltage across said first cell is greater than a voltage across said second cell.

4. The system as claimed in claim 1, wherein said currents flow through a plurality of paths to charge said cells, and wherein a path of said plurality of paths is disabled when an input switch that is coupled in series to said primary winding is turned on, and wherein said path is enabled when said input switch is turned off.

5. The system as claimed in claim 4, wherein said path comprises a diode.

6. The system as claimed in claim 4, wherein said path comprises an output switch.

7. The system as claimed in claim 6, wherein a switch controller controls said output switch based on a state of said input switch.

8. The system as claimed in claim 1, wherein a secondary winding of said secondary windings receives energy from said primary winding if an input switch coupled to said primary winding is turned on, and wherein said secondary winding of said secondary windings transforms said energy into a corresponding current of said currents if said input switch is turned off.

9. A method comprising:
receiving an input power at a primary winding;
transforming said input power into a plurality of currents using a plurality of secondary windings;
balancing a plurality of cells using said currents, wherein a ratio between a first turn number of a first secondary winding of said secondary windings and a second turn number of a second secondary winding of said secondary windings is determined by a nominal voltage ratio between two corresponding cells of said plurality of cells.

10. The method as claimed in claim 9, wherein said ratio between said first turn number and said second turn number is approximately equal to said nominal voltage ratio between said two corresponding cells.

11. The method as claimed in claim 9, further comprising:
charging said cells using said currents; and
controlling a current for charging a first cell of said cells to be less than a current for charging a second cell of said cells if a voltage across said first cell is greater than a voltage across said second cell.

12. The method as claimed in claim 9, further comprising:
transferring said currents to said cells via a plurality of paths;
disabling a path of said plurality of paths when an input switch that is coupled in series to said primary winding is turned on; and
enabling said path when said input switch is turned off.

13. The method as claimed in claim 9, wherein said transforming comprises:
receiving energy from said primary winding if an input switch coupled to said primary winding is turned on; and transforming said energy into said currents if said input switch is turned off.

14. A system comprising:
a plurality of terminals configured to provide a plurality of currents to balance a plurality of cells; and
a plurality of secondary windings coupled to said terminals and configured to transform an input power provided by a primary winding into said currents, wherein a ratio between a first turn number of a first secondary winding of said secondary windings and a second turn number of a second secondary winding of said secondary windings is determined by a nominal voltage ratio between two corresponding cells of said plurality of cells.

15. The system as claimed in claim 14, wherein said ratio between said first turn number and said second turn number is approximately equal to said nominal voltage ratio between said two corresponding cells.

16. The system as claimed in claim 14, wherein said cells are charged by said currents, and wherein a current for charging a first cell of said cells is less than a current for charging a second cell of said cells if a voltage across said first cell is greater than a voltage across said second cell.

17. The system as claimed in claim 14, wherein a secondary winding of said secondary windings is coupled to a corresponding cell of said cells via a path, and wherein a state of said path is controlled by a state of an input switch that is coupled in series to said primary winding.

18. The system as claimed in claim 14, wherein a secondary winding of said secondary windings receives energy from said primary winding if an input switch coupled to said primary winding is turned on, and wherein said secondary winding of said secondary windings transforms said energy into a corresponding current of said currents if said input switch is turned off.

19. The system as claimed in claim 14, further comprising:
a controller configured to adjust said input power by comparing a sensing signal indicative of said input power with a reference signal, and to adjust a sum of said currents by adjusting said reference signal.

20. The system as claimed in claim 19, wherein said controller is further configured to adjust said reference signal according to a voltage across each cell of said cells.

* * * * *